United States Patent Office 3,311,503
Patented Mar. 28, 1967

3,311,503
THERMAL CELL CONTAINING $V_2O_5$ DEPOLARIZING AGENT AND METHOD OF MAKING THE SAME
Glenn F. Zellhoefer, Normal, Ill., assignor, by mesne assignments, to National Union Electric Corporation, Stamford, Conn., a corporation of Delaware
No Drawing. Filed Jan. 27, 1954, Ser. No. 406,608
19 Claims. (Cl. 136—83)

This invention relates to thermal cells and methods of making the same, and has particular reference to such cells employing $V_2O_5$ as a depolarizing agent.

Thermal cells may be defined as electrochemical power supplies based upon electrolytes of various inorganic salts which remain solid and non-conducting at all storage temperatures. When the cell is heated to some elevated temperature the electrolyte melts and becomes conducting and electrical energy may then be withdrawn from the system.

While the desirability of using $V_2O_5$ as a depolarizing agent has been recognized, the difficulty of handling it and some of its characteristics have seriously discouraged its use. This invention eliminates the difficulties and overcomes the objections heretofore attending the use of $V_2O_5$ as a depolarizing agent.

A principal object of the invention, therefore, is to provide a new and improved thermal cell employing $V_2O_5$ as a depolorizing agent.

Another object of the invention is to provide a new and improved method of manufacturing thermal cells employing $V_2O_5$ as a depolarizing agent.

Other objects and advantages of the invention will be apparent from the following specification.

This invention contemplates the use of $V_2O_5$ as a depolarizer in systems such for example as Ca/KCl–LiCl/Ni; Mg/KCl–Licl/steel; Ni/CdCl2–NaCl–KCl/Mg; and Ni/CaCl2–NaCl–KCl/Ca.

According to one method, a water slurry made with five parts of finely powdered $V_2O_5$ and three parts of a eutectic mixture of KCl–LiCl is sprayed onto a KCl–LiCl electrolyte impregnated fibre glass tape, air dried and desiccated at 150° C. under 28″ vacuum. Thereafter the side of the tape with the $V_2O_5$ thereon is assembled in contact with the cathode of the cell.

The ratio of eutectic to $V_2O_5$ specified has been found to be desirable for a tape having a thickness of .007 inch coated with electrolyte where the overall thickness of the electrolyte impregnated tape is approximately .012 inch. However, the amount of eutectic employed will vary depending on the thickness of the tape and electrolyte coating thereon. In general the amount of eutectic used should be sufficient to provide adequate electrical conductivity during cell operation while maintaining the desired concentration of $V_2O_5$ at the cathode surface.

A variation of the foregoing method, consists of making a water slurry of one part of finely powered $V_2O_5$ with one part of the electrolyte such as a eutectic mixture of KCl–LiCl; painting the same on a fibre glass or asbestos tape which is then air dried and desiccated and then assembled with the painted side in contact with the cathode of the cell. In this instance the depolarizer is intimately admixed with the electrolyte in such proportions as to provide adequate electrical conductivity between the electrodes of the cell while maintaining the desired concentration of $V_2O_5$ at the cathode surface. The eutectic mixture of KCl–LiCl electrolyte functions when admixed with the $V_2O_5$ to substantially increase the current conducting characteristics of the $V_2O_5$ at the operating temperature of the cell.

A further variation of the method consists of making a slurry of finely powered $V_2O_5$ with aluminum phosphate sol which is painted on a cathode such as nickel and air dried at a temperature below the order of 500° F., thereby leaving a film of $V_2O_5$ on the cathode. The ratio of $V_2O_5$ to aluminum phosphate sol used is not critical and in general should be governed by the considerations previously referred to. The aluminum phosphate sol when dried functions as an adhesive to hold the $V_2O_5$ on the cathode. In addition the dried aluminum phosphate sol functions at the operating temperature of the cell to substantially increase the current conducting characteristics of the $V_2O_5$.

Other materials might be employed providing they are compatible with the system and the specifications of the cell. In the first and last examples given the $V_2O_5$ is disposed in the form of a film, the thicknes of which will depend upon the specifications of the cell.

In lieu of admixing the $V_2O_5$ with the specific electrolyte mentioned, the $V_2O_5$ can be admixed with the electrolyte of the system employed.

While I have described several embodiments of the invention it is capable of modification, and therefore I do not wish to be limited to the precise details set forth, but desire to avail myself of such changes as fall within the scope of the following claims.

I claim:
1. In an electrochemical power supply comprising a thermal cell including a mass of normally solid electrolyte, a depolarizing agent, and electrodes comprising a cathode and an anode; the improvement wherein said depolarizing agent comprises dried, powdered $V_2O_5$ intimately admixed with a normally solid current conducting material which is operable at the operating temperature of said cell to substantially increase the current conducting characteristics of said depolarizing agent, said agent being disposed in contact with said mass of electrolyte and said cathode.

2. A cell according to claim 1 wherein said material comprises an electrolyte, said electrolyte being admixed with said depolarizing agent.

3. A cell according to claim 1 embodying the system Ca/KCl LiCl/$V_2O_5$/Ni wherein said depolarizing agent and material comprises finely powered $V_2O_5$ and a eutectic mixture of KCl–LiCl.

4. A cell in accordance with claim 1 wherein said depolarizing agent and material is in the form of a film.

5. A cell according to claim 1 wherein said material comprises dry, finely powdered aluminum phosphate.

6. A cell according to claim 1 wherein one of said electrodes is magnesium and the other of said electrodes is nickel.

7. A cell according to claim 1 embodying the system Mg/KCl–LiCl/a depolarizing agent/Ni, and wherein said depolarizing agent comprises $V_2O_5$ and a eutectic mixture of KCl–LiCl.

8. In an electrochemical power supply comprising a thermal cell including a mass of normally solid electrolyte, a depolarizing agent, a cathode and an anode; the improvement wherein said depolarizing agent comprises a film composed of powdered $V_2O_5$ intimately admixed with a normally solid material which is operable at the operating temperature of said cell to substantially increase the current conducting characteristics of said $V_2O_5$, said film being disposed between and in contact with said mass of electrolyte and said cathode.

9. A cell in accordance with claim 8 embodying the system Ca/KCl–LiCl/$V_2O_5$/Ni.

10. A cell in accordance with claim 8 embodying the system Mg/KCl–LiCl/$V_2O_5$/steel.

11. A cell in accordance with claim 8 wherein said film is in the form of a coating on said cathode.

12. That method of incorporating a depolarizing agent in a thermal cell which includes the step of spraying a slurry of finely powdered $V_2O_5$ and a current conducting material on a tape and drying said slurry, and assembling said tape with the $V_2O_5$ thereon in contact with and between the cathode and the electrolyte of said cell.

13. A method according to claim 12 wherein said material comprises aluminum phosphate sol.

14. A method according to claim 12 wherein the cell embodies the system Ca/KCl–LiCl/$V_2O_5$/Ni and said material essentially consists of a eutectic mixture of KCl–LiCl.

15. A method according to claim 12 wherein the cell embodies the system Mg/KCl–LiCl/$V_2O_5$/Ni and said material essentially consists of a eutectic mixture of KCl–LiCl.

16. That method of incorporating a depolarizing agent in a thermal cell which includes the step of spraying a slurry of finely powdered $V_2O_5$ and a current conducting material on an electrolyte tape and drying said slurry, and assembling said tape with the $V_2O_5$ thereon in contact with the cathode of said cell.

17. A method according to claim 16 wherein said material comprises aluminum phosphate sol.

18. A method according to claim 16 wherein the cell embodies the system Ca/KCl–LiCl/$V_2O_5$/Ni and said material essentially consists of a eutectic mixture of KCl–LiCl.

19. A method according to claim 16 wherein the cell embodies the system Mg/KCl-LiCl/$V_2O_5$/Ni and said material essentially consists of a eutectic mixture of KCl–LiCl.

References Cited by the Applicant

UNITED STATES PATENTS 2,433,871   1/1948   Sutherland et al.

OTHER REFERENCES

Journal of the Electrochemical Society: August 1952, pages 207 and 208.

WINSTON A. DOUGLAS, *Primary Examiner.*

WILLIAM G. WILES, CARL D. QUARFORTH,
*Examiners.*

J. H. LINSCOTT, J. D. VOIGHT, A. B. CURTIS,
*Assistant Examiners.*